Nov. 8, 1955     A. H. HAVIR     2,723,011
PIN ENGAGED CLUTCH WITH BLOCKER
Filed Feb. 16, 1953     2 Sheets-Sheet 1
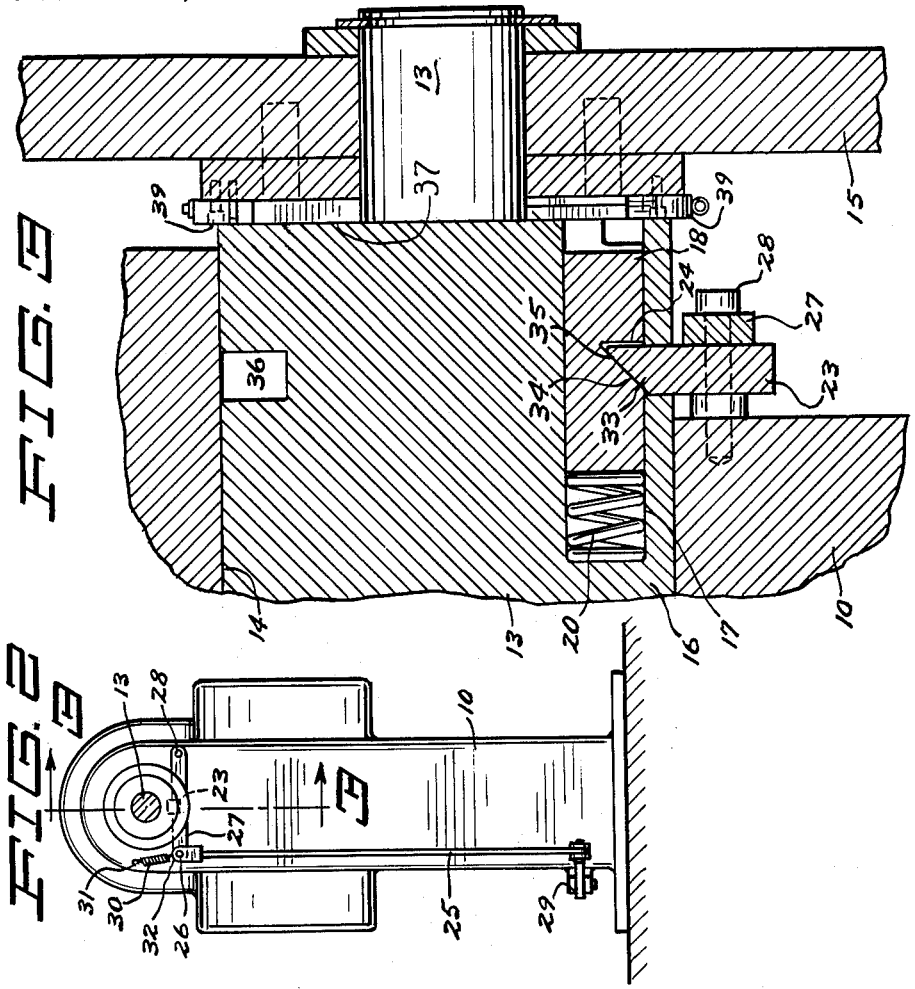
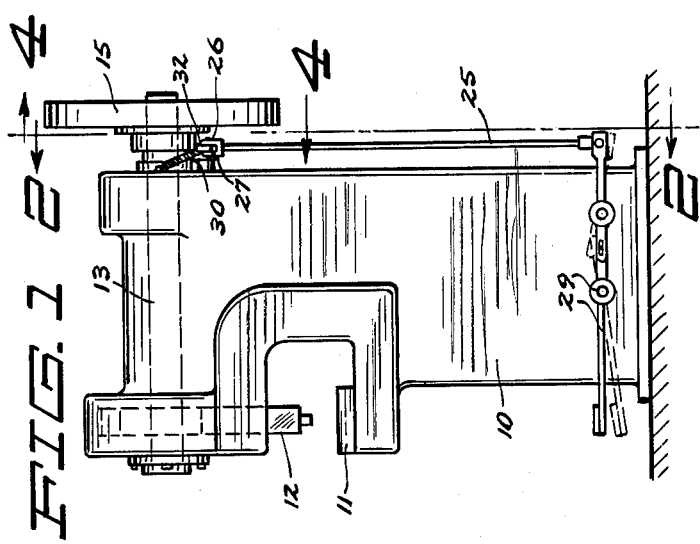
INVENTOR.
ANDREW H. HAVIR
BY Braddock and Braddock
ATTORNEYS

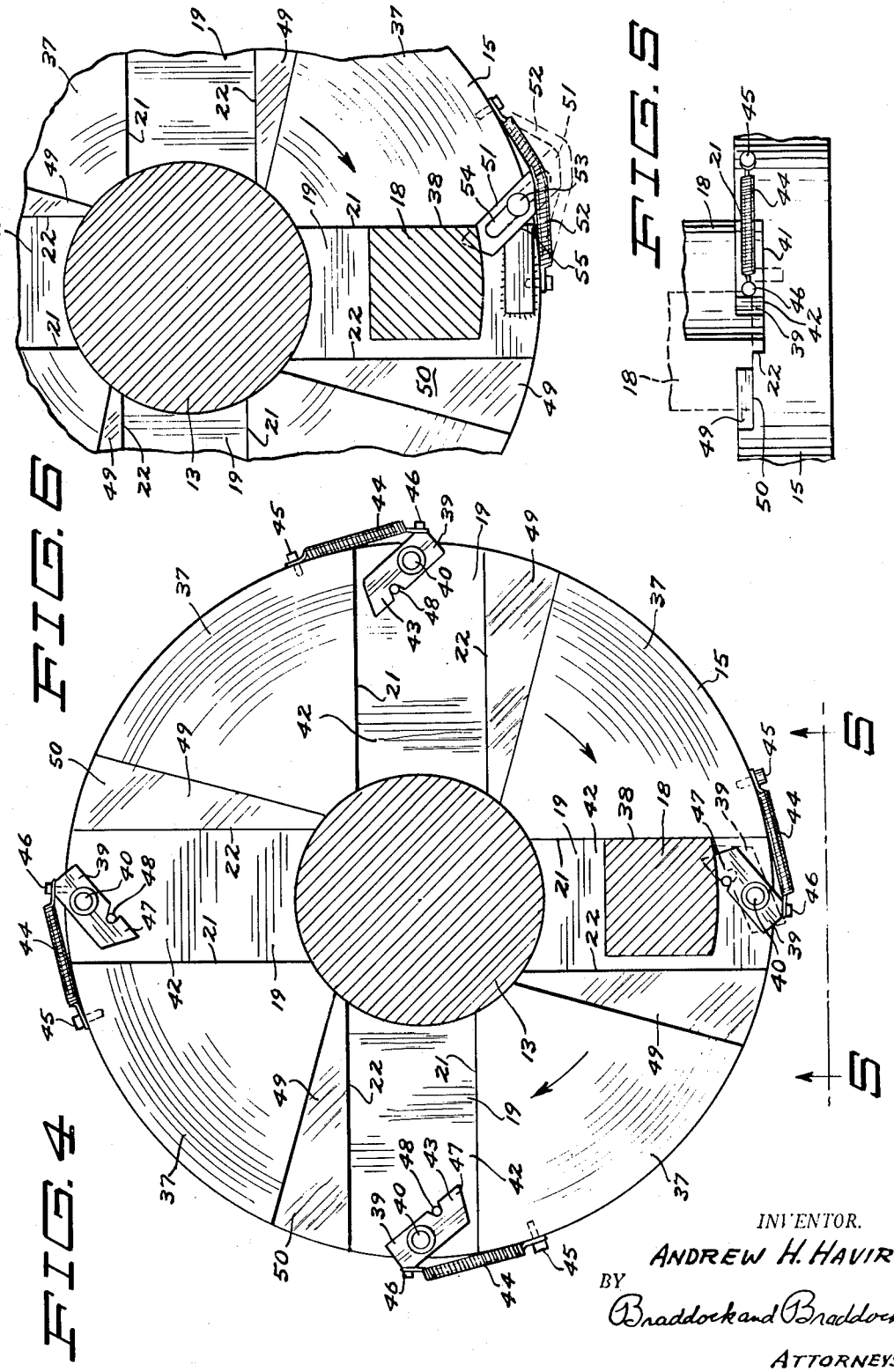

United States Patent Office 2,723,011
Patented Nov. 8, 1955

2,723,011

PIN ENGAGED CLUTCH WITH BLOCKER

Andrew H. Havir, St. Paul, Minn.

Application February 16, 1953, Serial No. 337,041

9 Claims. (Cl. 192—25)

The invention herein has relation to clutch mechanism capable of use for many purposes. As illustrated and described, the clutch mechanism is employed to clutch and unclutch a drive fly wheel or pulley and a crank shaft of a punch press, including a stationary lower member and a movable upper member adapted to be reciprocated relative to said stationary lower member in response to operation of said driven fly wheel or pulley and said crank shaft.

The fly wheel or pulley of a machine of character as above mentioned customarily is constantly driven by power actuated means. The movable upper member ordinarily is situated substantially at the upper limit of its upstroke when the machine is at rest. When the machine is set in motion, its power actuated fly wheel or pulley drives its crank shaft to cause its movable upper member to make a downstroke and an upstroke, said crank shaft is unclutched from said power actuated fly wheel or pulley upon approach of said movable upper member toward the upper limit of each upstroke, and a brake operates to bring the movable upper member to rest at the upper limit of each of its upstrokes.

The purpose or object of the invention is to provide a clutch mechanism of new and improved construction devised to be smoothly operable in satisfactory and efficient manner.

In the accompanying drawings forming a part of this specification,

Fig. 1 is a side elevational view of a machine including a stationary lower member and a movable upper member reciprocable relative to said stationary lower member in response to operation of a crank shaft by a power actuated fly wheel or pulley adapted to be clutched to and unclutched from said crank shaft, and also including clutch mechanism made according to the invention for connecting and disconnecting said power actuated fly wheel or pulley and said crank shaft;

Fig. 2 is a vertical sectional view, taken on line 2—2 in Fig. 1;

Fig. 3 is a detail sectional view, taken as on line 3—3 in Fig. 2;

Fig. 4 is an enlarged sectional view, taken on line 4—4 in Fig. 1;

Fig. 5 is a fragmentary elevational view of parts of the clutch mechanism as they would appear from the position of line 5—5 in Fig. 4; and Fig. 6 is a view corresponding generally with the disclosure of Fig. 4, but showing a modified form of the invention.

With respect to Figs. 1 to 5 of the drawings and the numerals of reference thereon, a machine 10 there shown includes a stationary lower member 11, a movable upper member 12 adapted to be reciprocated toward and away from said stationary lower member, a crank shaft 13 suitably and conveniently mounted, as at 14, upon the frame of said machine and assembled with said movable upper member, and a fly wheel or pulley 15 fixed against longitudinal movement on an end portion of said crank shaft adapted to be rotated by power actuated means (not shown) to in turn cause the crank shaft 13 to be rotated thus to cause said movable upper member 12 to be reciprocated.

A hub 16 integral or rigid with said crank shaft 13, situated at a side of the movable upper member 12 in adjacent relation to the fly wheel or pulley 15, has a rectangular concavity 17 therein which extends longitudinally of the crank shaft and is open to the end of said hub adjacent said fly wheel or pulley, and a rectilinear clutch key 18 is snugly slidable in said rectilinear concavity. Said rectilinear clutch key constitutes one of complemental elements of a clutch adapted to be operated selectively to drivingly connect the fly wheel or pulley 15 to and disconnect said fly wheel or pulley from said crank shaft. The other complemental element of said clutch is constituted as radial circumferentially spaced sockets 19 in the interior surface of the fly wheel or pulley 15, adjacent the hub 16 and situated to become consecutively alined with the rectangular concavity 17. A compression coil spring 20, having one of its ends seated against the base of the rectilinear concavity 17 and its other end engaged against the interior end of the clutch key 18, resiliently urges said clutch key outwardly toward the interior surface of the fly wheel or pulley 15. The sockets 19 will be of size to be capable of more or less freely receiving the outer end portion of the clutch key 18, and the construction and arrangement will be such that said outer end portion of said clutch key can fall into the socket next to become alined with the clutch key when it is urged against the interior surface of said fly wheel or pulley. It will be apparent that the fly wheel or pulley 15 and the crank shaft 13 will be clutched to each other when the clutch key 18 is seated in any one of the sockets 19, between a rearward drive surface 21 and a forward back lash preventing surface 22 thereof, both of which surfaces 21 and 22 are perpendicular to said fly wheel or pulley 15, and will be unclutched when said clutch key is in clearing relation to the sockets.

Means for actuating the clutch mechanism includes the compression coil spring 20 as a part thereof, and said means is operative to manipulate the clutch key 18 into and out of engagement with the sockets 19 thus to cause the fly wheel or pulley 15 to be connected with and disconnected from the crank shaft 13.

A clutch finger 23, adjacent to and in radially alined relation with the clutch key 18, is adapted to be situated in a transverse slot 24 across the exterior surface of said clutch key when the machine 10 is at rest and retain the clutch key in clearing relation to the fly wheel or pulley 15, as in Fig. 3 of the drawings.

A longitudinally reciprocable latch bar 25 pivotally connected, at 26, to an arm 27, itself pivotally mounted at 28 on the machine frame and rigidly supporting the clutch finger 23, is adapted to be actuated, as by a foot pedal 29, to remove said clutch finger from the transverse slot 24 and release the clutch key 18 to resilient action of the compression coil spring 20 thus to cause or permit said clutch key to be engaged in a socket 19 and cause the crank shaft to be operated by the fly wheel or pulley while power actuated and the clutch key to be rotated away from its alined relation with the clutch finger. A tension coil spring 30, secured at 31 to the machine frame and at 32 to the pivotally mounted arm 27, is operative to situate the clutch finger 23 in the path of rotative movement of the clutch key 18 in the circumference of its transverse slot 24 upon release of the foot pedal 29. Said clutch key is adapted to ride over the clutch finger upon approach of the clutch key toward the end of each complete revolution of the crank shaft 13, with the foot pedal released, to cause said clutch finger to enter said transverse slot 24. The clutch finger while retained in the transverse slot is adapted to cause the clutch key to be actuated to unclutched position, by reason of force of the tension coil spring 30 acting against resilient action of the compression coil spring 20, in response to rotative movement ahead of said clutch key from the radial position in which situated when the clutch finger commences entry into the transverse slot and to retain the clutch key in clearing relation to the fly wheel or pulley upon completion of each revolution of the crank shaft and said clutch key. A free end portion 33 of the clutch finger 23 includes an upwardly facing beveled surface 34 at the interior of its upper side to be engaged against a beveled surface 35 bounding the interior side of the transverse slot 24 and extending outwardly of the crank shaft 13. The crank shaft hub 16 includes a circumferential slot 36 substantially alined with the transverse slot 24 and the free end portion of the clutch finger 23 having the beveled surface 34 for receiving and affording passage for said mentioned free end portion of said clutch finger during rotation of the crank shaft.

Clutch mechanism of construction as hereinbefore described is now of commerce. Each time released, a clutch key such as 18 will be forced outwardly, under action of a compression coil spring such as 20, either to cause the clutch key to be situated in a socket such as 19, or the exterior surface of said clutch key to be engaged against a flat surface 37 of a fly wheel or pulley such as 15 perpendicular to the crank shaft 13 and disposed interiorly of sockets such as 19 and their rearward and forward bounding walls such as 21 and 22. In many instances, a forward part of the exterior surface of the clutch key, adjacent the forward side edge 38 thereof, will strike a shearing or glancing blow at or adjacent to the interior edge of a rearward drive surface 21 bounding a socket 19, upon release of said clutch key, to have tendency toward mutilating the flat surface 37 at location adjacent one or another of said rearward drive surfaces. In some instances, the forward edge of the exterior surface of the clutch key will be sharply arrested by engagement thereof with a part of the flat surface 37 in proximate relation to and at the rear of a rearward drive surface 21, and then slip off of said flat surface and be drivingly forced backward toward the base of the rectangular concavity 17.

Novel and improved features and characteristics now to be described have been incorporated to eliminate disadvantages encountered in practical operation of clutch mechanisms as heretofore employed.

Each radially extending socket 19 contains a clutch key arrester 39 situated in the outer end of the socket. As disclosed very clearly in Figs. 4 and 5, each clutch key arrester has an intermediate portion thereof pivotally mounted, as at 40, upon a wall defining the base of the corresponding socket 19, between its rearward drive surface 21 and its forward back lash preventing surface 22. Each clutch key arrester 39 has an exterior surface 41 thereof ridable upon a flat surface 42 at the base of the corresponding socket 19, and an interior surface 43 thereof, opposite the exterior surface 41, substantially in the plane of the flat interior surface 37 of the fly wheel or pulley 15. The clutch key arresters 39 are normally retained in position about as disclosed in Fig. 4. More explicitly stated, a tension coil spring 44, having one of its ends connected as at 45 to the fly wheel or pulley 15 and its other end connected as at 46 to an outer portion of a corresponding clutch key arrester, normally retains an inner portion 47 of said corresponding clutch key arrester against a stop pin 48. The stop pins 48 and the pivotal supports 40 are spaced at greater distance from the longitudinal axis of the crank shaft 13 than is the clutch key 18. An outer portion of said clutch key is spaced from the longitudinal axis of said crank shaft at greater distance than is a part of said inner portion 47 of each clutch key arrester and its interior surface 43.

The fly wheel or pulley 15 is cut away, radially as shown, at locations, denoted 49, disposed forwardly of and in contiguous relation to each of the sockets 19 to provide clearance for outward travel of the clutch key when released to occur in advance of longitudinal alinement with the next succeeding socket 19. Stated differently, the clearance spaces 49 permit the clutch key to become alined with the rearward drive surfaces 21 bounding the rear of the sockets 19 in the direction of rotation of the fly wheel or pulley 15 in instances when said clutch key is pushed outwardly by the compression coil spring 20 while approaching any of the sockets. As will be clear from Fig. 5, the width or depth of each forward back lash preventing surface 22 is less than the width or depth of each rearward drive surface 21. That is, a ledge or surface 50 bounding or defining the base of each cutaway portion 49 is situated in a plane between the planes of the surfaces 37 and 42. The rearward edge of each ledge or surface 50 merges in the interior edge of an adjacent and contiguous forward back lash preventing surface 22.

The construction and arrangement will be such that in instances when the clutch key 18 drops into clearance spaces, against ledges or surfaces 50, to the front of the sockets 19 during advancement of the fly wheel or pulley 15, said clutch key will enter the sockets and rotate the arresters 39 out of the path of the clutch key, as in dotted lines in Fig. 5. The construction and arrangement also will be such that in any instance when the clutch key is actuated outwardly by the compression coil spring 20 with a forward portion of the exterior surface of said clutch key situated at or adjacent to a rearward drive surface 21, outward motion of said clutch key will be interrupted by the arrester. The clutch key will be made to slide over the outer surface of the arrester and the portion of the interior surface 37 of the fly wheel or pulley 15 at the rear of the corresponding socket, to become positioned in the next succeeding clearance space and the socket contiguous therewith. The tension coil springs 44 will retain the arresters 39 in their positions as in Fig. 4 at all times except when the arresters are being rotated by and out of the way of the clutch key.

The disclosure as in Fig. 6 is substantially the same as hereinbefore described, except that the clutch key arrester 51 disclosed in said Fig. 6 is longitudinally slidable, instead of rotatable, as is the clutch key arrester 39. A tension coil spring 52 normally retains an inner end portion of the clutch key arrester 51 in circumferential alinement with an outer portion of the clutch key 18. A pin 53 in an elongated slot 54 in the clutch key arrester 51 permits said arrester to be longitudinally reciprocated. The arrester 51 is guided for longitudinal movement, as denoted generally at 55.

When the clutch key of Fig. 6 drops into a clearance space, against a ledge or surface 50, to the front of and contiguous with a socket 19, said clutch key will enter the socket and cause the arrester 51 therein to be slid longitudinally out of the way of the clutch key. Upon removal of the clutch key from the sockets, the tension coil spring 52 will act to return the arresters 51 to normal position. In instances when the clutch key of Fig. 6 is actuated outwardly while a rearward drive surface 21 and said clutch key are in proximate relation; alined longitudinally of the crank shaft 13; the arresters 51 will function in the same general manner as set forth in connection with the arresters 39.

What is claimed is:

1. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, a second clutch element rotatable with said member to be driven and having width to be received within said socket, means for urging said second clutch element in direction toward the member to be power actuated, and an arrester in said socket selectively for permitting and precluding entry of the second clutch element into said socket.

2. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, said member to be power actuated being cut away at a location in advance of and providing a ledge contiguous with said back lash preventing surface and situated between said first and second surfaces, a second clutch element rotatable with said member to be driven and having width to be received within said socket, means for urging said second clutch element toward and against the member to be power actuated, and an arrester in said socket selectively for permitting and precluding entry of the second clutch element into said socket.

3. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, said member to be power actuated being cut away at a location in advance of and providing a ledge contiguous with said back lash preventing surface and situated between said first and second surfaces, a second clutch element rotatable with said member to be driven and having width to be received within said socket, an arrester in said socket at the rear of said ledge, and means for urging said second clutch element toward and against said member to be power actuated, said second clutch element being capable of engaging said ledge and entering said socket at a location in advance and clear of said arrester with rotatable advancement of said member to be power actuated, and the arrester being operative to preclude entry of the second clutch element into the socket at a location to the rear of said ledge and adjacent said socket.

4. The combination as specified in claim 3 wherein the second clutch element is operative upon entry into said socket to cause said arrester to be moved clear of said second clutch element, and resilient means normally retaining a portion of said arrester in position to be engaged by said second clutch element in response to rotatable advancement of said member to be power actuated.

5. The combination as specified in claim 3 wherein said arrester includes a surface substantially in the plane of said first surface.

6. The combination as specified in claim 3, said arrester having a surface substantially in the plane of said first surface, the second clutch element being operative upon entry into said socket to cause said arrester to be moved clear of said second clutch element, and resilient means normally retaining said surface of the arrester in the plane of said first surface in position to be engaged by said second clutch element in response to rotational advancement of said member to be power actuated.

7. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, said member to be power actuated being cut away at a location in advance of and providing a ledge contiguous with said back lash preventing surface and situated between said first and second surfaces, a second clutch element rotatable with said member to be driven and having width to be received within said socket, an arrester in said socket at the rear of said ledge and rotatable with said first clutch element clear of said second clutch element, and means for urging said second clutch element toward and against said member to be power actuated, said second clutch element being capable of engaging said ledge and entering said socket while clear of and at a location in advance of said arrester in response to advancement of said member to be power actuated, and the arrester being operative to preclude entry of the second clutch element into the socket save by way of said cutaway location and after said second clutch element has engaged said ledge.

8. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, said member to be power actuated being cut away at a location in advance of and providing a ledge contiguous with said back lash preventing surface and situated between said first and second surfaces, a second clutch element rotatable with said member to be driven and having width to be received within said socket, an arrester in said socket at the rear of said ledge and rotatable with said first clutch element clear of said second clutch element, resilient means normally retaining said arrester in position to be engaged by said second clutch element in response to rotational advancement of said member to be power actuated, and means for urging the second clutch element toward and against said member to be power actuated, said means being operative to forcibly actuate said second clutch element against said ledge while clear and in advance of said arrester, the arrester being operative to preclude entry of the second clutch element into the socket except after said second clutch element has engaged said ledge, and said second clutch element being operative only after engaging said ledge at a location in advance of said arrester to cause the arrester to be moved clear of the second clutch element in response to rotational advancement of the member to be power actuated.

9. In combination, a rotatably mounted member to be driven, a rotatably mounted member to be power actuated providing a first surface adjacent and in perpendicular relation to the longitudinal axis of said member to be driven, a first clutch element constituted as a socket in said member to be power actuated bounded at the base thereof by a second surface disposed at the side of said first surface opposite said member to be driven, at the rear thereof by a drive surface between and contiguous with said first and second surfaces and at the front thereof by a back lash preventing surface, said member to be power actuated being cut away at a location in advance of and providing a ledge contiguous with said back lash preventing surface and situated between said first and second surfaces, a second clutch element rotatable with said member to be driven and having width to be received within said socket, an arrester in said socket at the rear of said ledge having a surface substantially in the plane of said first surface, resilient means normally retaining said surface of the arrester in position to be engaged by said second clutch element in response to rotational advancement of said member to be power actuated, and means for urging the second clutch element toward and against said member to be power actuated, said means being operative to forcibly actuate said second clutch element against said ledge while clear of and in advance of said arrester, the arrester being operative to preclude entry of the second clutch element into the socket except after said second clutch element has engaged said ledge, and said second clutch element being operative only after engaging said ledge at a location in advance of said arrester to cause said surface of the arrester to be moved clear of the second clutch element in response to rotational advancement of the member to be power actuated.

References Cited in the file of this patent

UNITED STATES PATENTS

| | | |
|---|---|---|
| 2,257,006 | Hall | Sept. 23, 1941 |
| 2,506,452 | Havir | May 2, 1950 |
| 2,667,252 | Meyer | Jan. 26, 1954 |

FOREIGN PATENTS

| | | |
|---|---|---|
| 285,891 | Germany | July 16, 1915 |
| 334,649 | Great Britain | Sept. 11, 1930 |
| 631,601 | Germany | June 24, 1936 |